United States Patent [19]

Daggett et al.

[11] Patent Number: 4,874,997
[45] Date of Patent: Oct. 17, 1989

[54] DIGITAL ROBOT CONTROL PROVIDING PULSE WIDTH MODULATION FOR A BRUSHLESS DC DRIVE

[75] Inventors: Kenneth E. Daggett, Murrysville, Pa.; Eimei M. Onaga, Brookfield Center; Richard J. Casler, Jr., Newtown, both of Conn.; Richard A. Johnson, Murrysville, Pa.

[73] Assignee: Unimation, Inc., Danbury, Conn.

[21] Appl. No.: 178,813

[22] Filed: Apr. 1, 1988

Related U.S. Application Data

[63] Continuation of Ser. No. 932,974, Nov. 20, 1986.

[51] Int. Cl.$^4$ .................................................. G05B 5/00
[52] U.S. Cl. .............................. 318/568.1; 318/568.2; 318/568.22; 318/567; 318/565; 318/599; 364/513; 901/23; 901/19
[58] Field of Search ................ 318/254, 138, 313, 314, 318/317, 326, 327, 341, 345 R, 345 B, 439, 563, 568 R, 568 M, 560, 565, 566, 567, 574, 590, 599, 603, 608, 615, 616, 617, 618, 685; 364/478, 513, 573, 169, 167.01, 174; 901/19, 20, 22, 23, 24

[56] References Cited

U.S. PATENT DOCUMENTS

| | | |
|---|---|---|
| 3,713,011 | 1/1973 | Johnson et al. . |
| 4,107,594 | 8/1978 | Jacobs .............................. 318/138 X |
| 4,107,595 | 8/1978 | Campe ............................. 318/138 X |
| 4,259,626 | 3/1981 | Nomura et al. ..................... 318/599 |
| 4,277,825 | 7/1981 | Johnson . |
| 4,286,222 | 8/1981 | Caputo . |
| 4,286,315 | 8/1981 | Johnson . |
| 4,303,871 | 12/1981 | Berry ................................... 318/138 |
| 4,307,793 | 12/1981 | Caputo . |
| 4,377,847 | 3/1983 | Daniel et al. .................... 318/685 X |
| 4,523,134 | 6/1985 | Kinoshita et al. .............. 318/599 X |
| 4,523,135 | 6/1985 | Kogawa ............................ 318/615 |
| 4,558,264 | 12/1985 | Weischedel .................... 318/439 X |
| 4,578,746 | 3/1986 | Gyugyi et al. . |
| 4,583,028 | 4/1986 | Angersbach et al. .......... 318/138 X |
| 4,599,545 | 7/1986 | Moriki et al. .................... 318/599 X |
| 4,644,234 | 2/1987 | Nola ................................. 318/138 X |
| 4,673,859 | 6/1987 | Shero et al. . |
| 4,682,089 | 7/1987 | Tanari ............................. 318/565 X |
| 4,686,437 | 8/1987 | Langley et al. ................. 318/138 X |
| 4,697,125 | 9/1987 | Goff et al. ....................... 318/439 X |

Primary Examiner—William M. Shoop, Jr.
Assistant Examiner—Paul Ip
Attorney, Agent, or Firm—J. L. Brzuszek

[57] ABSTRACT

Circuitry is provided for applying a pulse width modulation (PWM) scheme to a brushless DC motor that operates as a robot axis drive. A pulse width modulation (PWM) scheme provides for digital implementation of robot control commands. For this purpose, it provides time stabilized current sampling synchronized to the sampling frequency of the position and velocity loops in the robot control. The brushless drive application circuitry provides for application of the PWM control outputs to commutate the motor energization from winding pair to winding pair.

5 Claims, 13 Drawing Sheets

DIGITAL ROBOT CONTROL PROVIDING PULSE WIDTH MODULATION FOR A BRUSHLESS DC DRIVE

This application is a continuation of application Ser. No. 06/932,974 filed Nov. 20, 1986.

CROSS REFERENCE TO RELATED APPLICATIONS

The following concurrently filed patent applications, each filed on Nov. 20, 1986, are related to the disclosure of the present application, assigned to the present assignee and are hereby incorporated by reference:

U.S. Ser. No. 932,975, (W. E. Case 53,224) now continuation Ser. No. 180,719 filed Apr. 4, 1988 (W. E. Case 53,224C) entitled DIGITAL ROBOT CONTROL HAVING AN IMPROVED CURRENT SENSING SYSTEM FOR POWER AMPLIFIERS IN A DIGITAL ROBOT CONTROL and filed by Kenneth E. Daggett, Leonard C. Vercellotti, Richard A. Johnson, Richard J. Casler and Eimei Onaga.

U.S. Ser. No. 932,841 (W. E. Case 53,225), now continuation Ser. No. 231,627, filed Aug. 5, 1988 (W. E. Case 53,225C) entitled DIGITAL ROBOT CONTROL HAVING AN IMPROVED PULSE WIDTH MODULATOR and filed by Kenneth E. Daggett.

U.S. Ser. No. 932,992 (W. E. Case 53,226) now continuation Ser. No. 180,703 filed Apr. 5, 1988 (W. E. Case 53,226C) entitled COMMUNICATON INTERFACE FOR MULTI-MICROPROCESSOR SERVO CONTROL IN A MULTI-AXIS ROBOT CONTROL SYSTEM and filed by Kenneth E. Daggett.

U.S. Pat. No. 4,763,055 (W. E. Case 53,227) entitled DIGITAL ROBOT CONTROL HAVING HIGH PERFORMANCE SERVO CONTROL SYSTEM and filed by Kenneth E. Daggett, Richard J. Casler and Eimei Onaga.

U.S. Ser. No. 932,853 (W. E. Case 53,368) now continuation Ser. No. (180,723) filed Apr. 14, 1988 (W. E. Case 53,368C) entitled IMPROVED POSITION AND VELOCITY FEEDBACK SYSTEM FOR A DIGITAL ROBOT CONTROL and filed by Kenneth E. Daggett, Richard J. Casler and Eimei Onaga.

U.S. Ser. No. 932,983 (W. E. Case 53,369) entitled UNIVERSAL ROBOT CONTROL BOARD CONFIGURATION and filed by Richard J. Casler, Eimei Onaga, Vincent P. Jalbert, Barrett Booth, and Kenneth E. Daggett.

U.S. Ser. No. 932,991 (W. E. Case 53,372) entitled BASIC DIGITAL MULTIAXIS ROBOT CONTROL HAVING MODULAR PERFORMANCE EXPANSION CAPABILITY and filed by Kenneth E. Daggett, Barrett Booth, Eimei Onaga and Richard J. Casler.

U.S. Pat. No. 4,786,847 W. E. Case 53,373 entitled IMPROVED DIGITAL CONTROL FOR MULTIAXIS ROBOTS and filed by Kenneth E. Daggett, Richard J. Casler, Eimei Onaga, Barrett Booth, Rajan Penkar, Leonard C. Vercellotti and Richard A. Johnson.

U.S. Ser. No. 932,983 (W. E. Case 53,374) entitled MODULAR ROBOT CONTROL SYSTEM and filed by Kenneth E. Daggett, Barrett Booth, Vincent P. Jalbert, Eimei Onaga and Richard J. Casler.

U.S. Ser. No. 932,977, now continuation Ser. No. 180,601 filed Apr. 6, 1988 (W. E. Case 53,423C) entitled MULTIPROCESSOR TORQUE SERVO CONTROL FOR MULTIAXIS DIGITAL ROBOT CONTROL SYSTEM and filed by Kenneth E. Daggett, Richard J. Casler and Eimei Onaga.

U.S. Ser. No. 932,990 (W. E. Case 53,424) now continuation Ser. No. 180,723 filed Apr. 4, 1988 (W. E. Case 53,424C) entitled MULTIPROCESSOR POSITION/VELOCITY SERVO CONTROL FOR MULTIAXIS DIGITAL ROBOT CONTROL SYSTEM and filed by R. Lancraft, Eimei Onaga, Richard J. Casler, J. Kenneth E. Daggett and Barrett Booth.

U.S. Pat. No. 4,829,219 (W. E. Case 53,489) entitled MULTIAXIS ROBOT HAVING IMPROVED MOTION CONTROL THROUGH VARIABLE ACCELERATION/DECELERATION PROFILING and filed by Rajan Penkar.

U.S. Pat. No. 4,774,445 (W. E. Case 53,490) entitled MULTIAXIS ROBOT CONTROL HAVING CAPABILITY FOR EXECUTING TIMED MOVES and filed by Rajan Penkar.

U.S. Pat. No. 4,772,831 (W. E. Case 53,491) entitled MULTIAXIS ROBOT CONTROL HAVING IMPROVED CONTINUOUS PATH OPERATION and filed by Rajan Penkar.

U.S. Pat. No. 4,773,025 (W. E. Case 53,492) entitled MULTIAXIS ROBOT CONTROL HAVING FITTED CURVED PATH CONTROL and filed by Rajan Penkar.

U.S. Ser. No. 932,973 (W. E. Case 53,493) now continuation Ser. No. 180,598 filed Apr. 6, 1988 (W. E. Case 53,493C) entitled MULTIAXIS ROBOT CONTROL HAVING IMPROVED ENERGY MONITORING SYSTEM FOR PROTECTING ROBOTS AGAINST JOINT MOTOR OVERLOAD and filed by Eimei Onaga.

U.S. Pat. No. 4,807,153 (W. E. Case 53,494) entitled MULTAXIA DIGITAL ROBOT CONTROL HAVING A BACKUP VELOCITY MONITOR AND PROTECTION SYSTEM and filed by Eimei Onaga.

BACKGROUND OF THE INVENTION

The present invention relates to robot control systems and more particularly to the energization and control of brushless DC joint motors employed in such systems.

Better robot performance and more economic robot control manufacture can be achieved with use of a completely digital robot control system as more fully considered in the various cross-referenced patent applications. The digital robot control disclosed in these applications includes digital pulse width modulation (PWM) circuitry employed to control the on time for drive current supplied to the robot joint motors. In W. E. 53,225, the PWM circuitry is fully disclosed and claimed, and it is described in connection with both DC brush type robot joint motors and DC brushless robot joint motors.

Since the disclosed PWM circuitry embodiment is structured to produce output control signals operative to switch power amplifier circuitry employed with DC brush type robot joint motors, a need has existed to adapt the PWM circuitry for operation with DC brushless robot joint motors. Such adaptation requires provision of commutation for the brushless motor windings in addition to basic on/off winding energization control.

Although commutation has been provided by analog circuitry in power amplifiers for brushless DC motors in the prior art, such known commutation schemes have no application to the more advanced digital robot control.

The present invention accordingly is directed to the adaptation of digital PWM circuitry to brushless DC motors in a digital robot control.

SUMMARY OF THE INVENTION

A digital robot control is provided for a robot bearing a plurality of arm joints with each joint driven by a brushless DC motor. A power amplifier is provided for each motor and has six switching means interconnected with the three motor phase windings to direct drive current through series paired windings corresponding to the sequenced switching operation of pairs of the switching means.

A digital pulse width modulator circuit having up-/down counter means for generating a sawtooth waveform as a function of time, and the counter means count is compared to a signal representing a control command so as to define the time width of forward and reverse reference control pulses for the power amplifier switching means in accordance with the control command and command polarity. An enabling reference control pulse is generated for each of the reference control pulses and a plurality of phase displaced signals representative of motor rotor position are generated. Respective control pulses operate the six power amplifier switching means and correspond in time width to the reference control pulses.

Commutating means responsive to the position signals and the polarity command apply successive pairs of the switch control pulses to the switching means so as to produce motor drive current for the command time as the motor current path is commutated from winding pair to winding pair in accordance with the command polarity and a predetermined sequence. Feedback control loop means are provided for each arm joint and include at least position, velocity and current control loops through and operating the associated pulse width modulator circuit.

DESCRIPTION OF THE PREFERRED EMBODIMENT

ROBOTS-GENERALLY

Robot capabilities generally range from simple repetitive point-to-point motions to complex motions that are computer controlled and sequenced as part of an integrated manufacturing system. In factory applications, robots can perform a wide variety of tasks in various manufacturing applications including: die casting, spot welding, arc welding, investment casting, forging, press working, spray painting, plastic molding, machine tool loading, heat treatment, metal deburring, palletizing, brick manufacturing, glass manufacturing, etc. For more complete consideration of robots and their uses, reference is made to a book entitled "Robotics in Practice" published in 1980 by Joseph F. Engelberger.

To perform work within its sphere of influence, a robot typically is provided with an arm, a wrist subassembly and an end effector. The coordinate system employed for the robot arm typically is Cartesian, cylindrical, polar or revolute. Generally, three motion axes are employed to deliver the wrist subasembly anywhere within the sphere of influence and three additional motion axes are employed for universal orientation of the end effector. A drive system is used for each motion axis, and it may be electrical, hydraulic or pneumatic.

PUMA ROBOT

Figure 1:
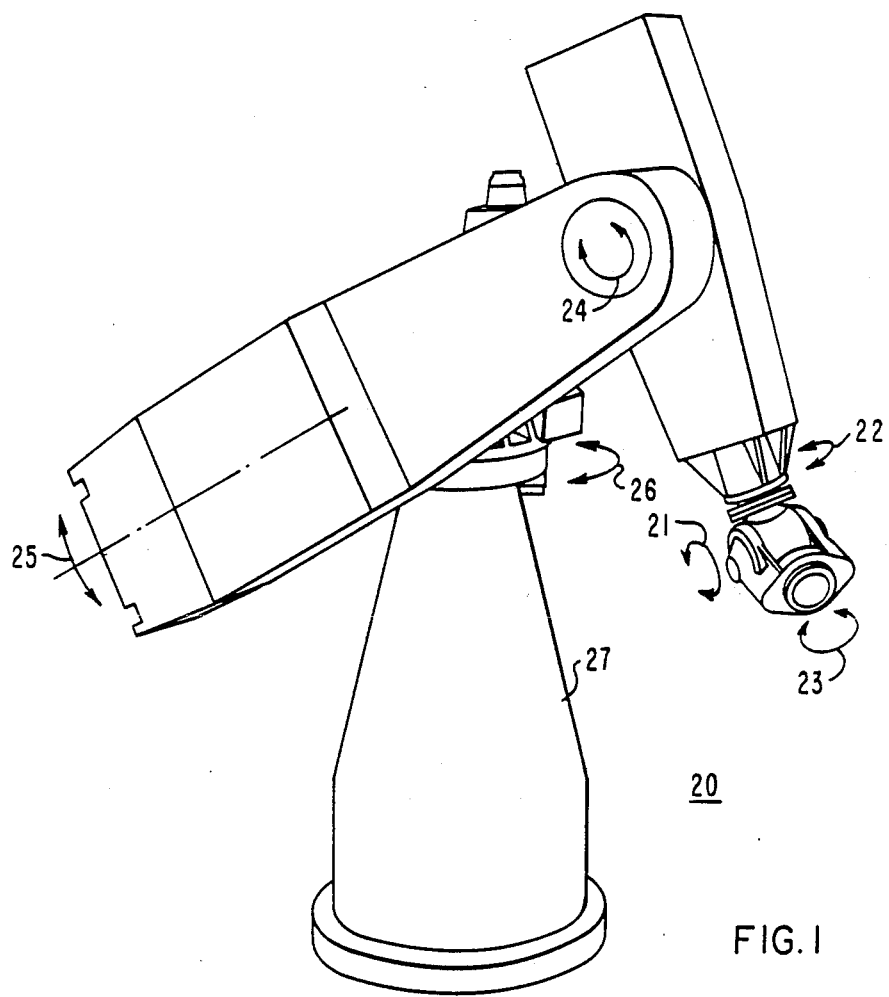
FIG. 1 shows a perspective view of a robot which employs DC brush type arm joint motors but which otherwise is similar to robots which employ brushless DC arm joint motors operable in accordance with the invention.

More particularly, there is shown in FIG. 1 a six-axis industrial electric robot 20 which employs brush type DC motors but which is otherwise illustrative of a wide variety of robots that can be operated in accordance with the principles of the invention. The robot 20 is a relatively powerful electric robot sold by Unimation Company, a wholly owned subsidiary of the present assignee, under the trade name UNIMATE PUMA SERIES 700. The Model 761 PUMA has a 22 pound payload capacity and a reach of 59.1 inches. The Model 762 PUMA has a 44 pound payload capacity and a reach of 49.2 inches.

PUMA 700 Series robots are designed with flexibility and durability to ensure long life and optimum performance in even the harshest, most demanding manufacturing environments. Specific customer needs for either higher payload or extended reach determine which model is suitable for a particular task.

With its longer reach, the PUMA 761 is ideally suited for precise, repetitive tasks such as arc welding and sealant dispensing. The PUMA 762 performs high-precision material handling, machine loading, inspection, testing, joining and assembly in medium and heavier weight applications. The PUMA robots occupy mineral floor space, yet a large work envelope allows the robot to service multiple machines and work surfaces.

Each axis motion is generated by a brush type DC electric motor, with axis position feedback generated by incremental encoders. With the use of brushless DC motors in the robot 20 or similar robots, a basis is provided for implementing the present invention.

As shown, the wrist of the robot 20 is provided with three articulations, i.e., an up/down rotation indicated by arrow 21, a left/right rotation indicated by arrow 22, and a third motion indicated by arrow 23. Elbow and shoulder rotations in the up/down direction are respectively indicated by arrows 24 and 25. Finally, a left/right arm rotation on a base 27 is indicated by arrow 26.

ROBOT CONTROL

The present invention is directed to a robot control 30 (FIGS. 2, 3 or 4) which can operate the robot 20 adapted with brushless DC motors and other robots including the larger Unimation 860 robots which employ brushless DC axis motors and absolute position feedback. Generally, however, the robot control 30 is universally and flexibly applicable to differing kinds and sizes of robots in stand alone or robotic network operation.

As a result of its unifersality, the control 30 can be arranged to operate a complete family of robots. Thus, all hydraulically and electrically driven robot arms manufactured by Unimation, a company of Westinghouse, assignee of the present invention, can be operated by the control 30. The key to the family usage, or more generally the universality of the control 30 lies in modularization and in minimizing the use of arm dependent hardware and avoiding the use of any arm dependent hardware in as much of the modular control structure as possible. The robot control 30 is identified by the acronym UNIVAL and operates with completely digital servo control to provide better robot performance with lower cost.

CONTROL LOOPS

Figure 2:
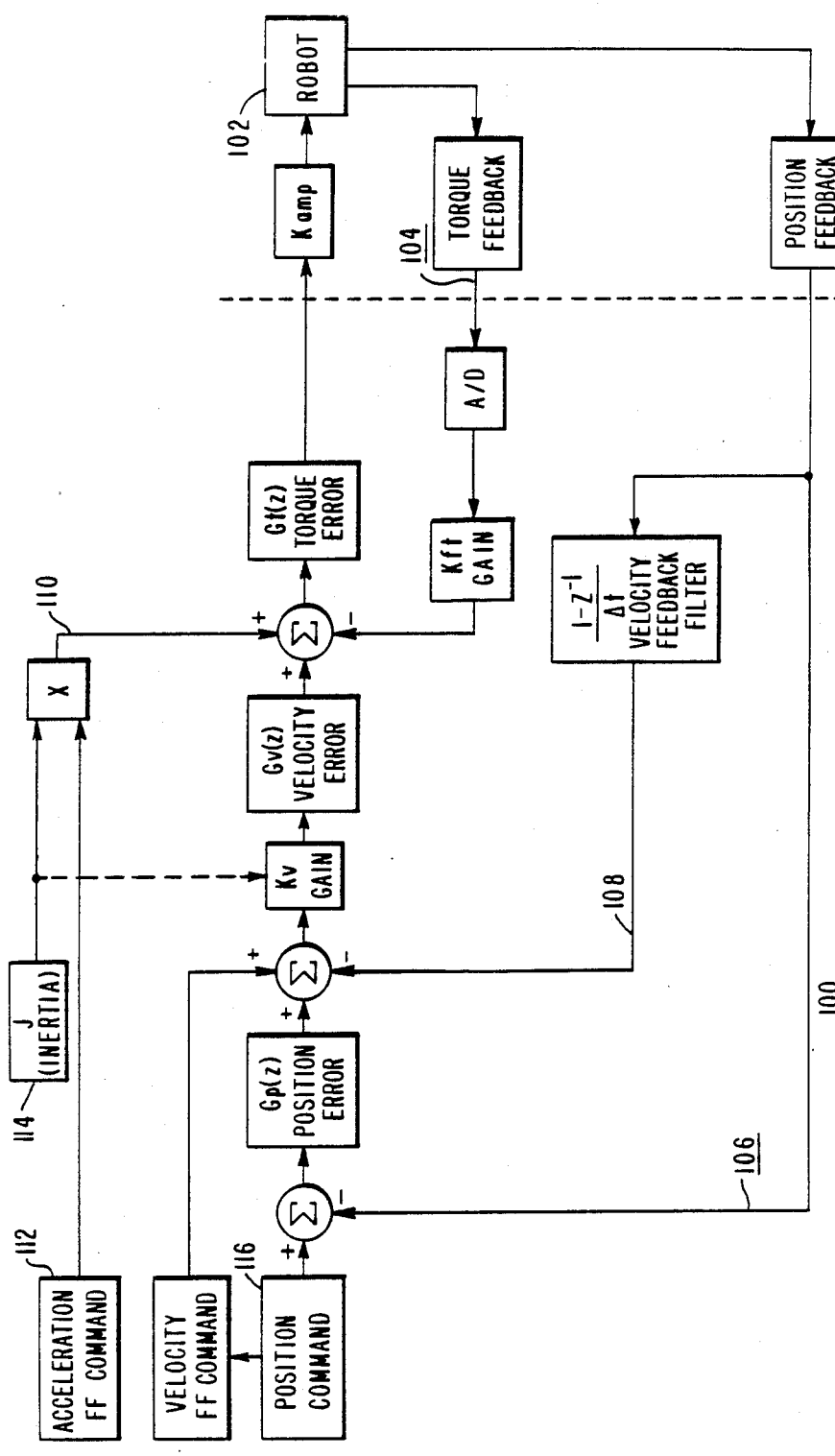
FIG. 2 shows a generalized block diagram of a control loop arrangement employing position, velocity and torque control loops in which the invention may be embodied.

In FIG. 2, there is shown an embodiment of a generalized control loop configuration 100 employable in the UNIVAL TM robot control. Thus, each robot arm joint motor 102 is operated by a torque control loop 104. An outer position control loop 106 is tandem connected to a velocity control loop 108 which in turn drives the torque control loop 104. A feedforward acceleration control loop 110 is responsive to acceleration command 112 and arm and load inertia 114 is also directly coupled to the input of the torque control loop 104. The robot arm is operated by the control loop 100 in accordance with a robot program through a stream of program position commands 116 applied to the position control loop.

Figure 3:
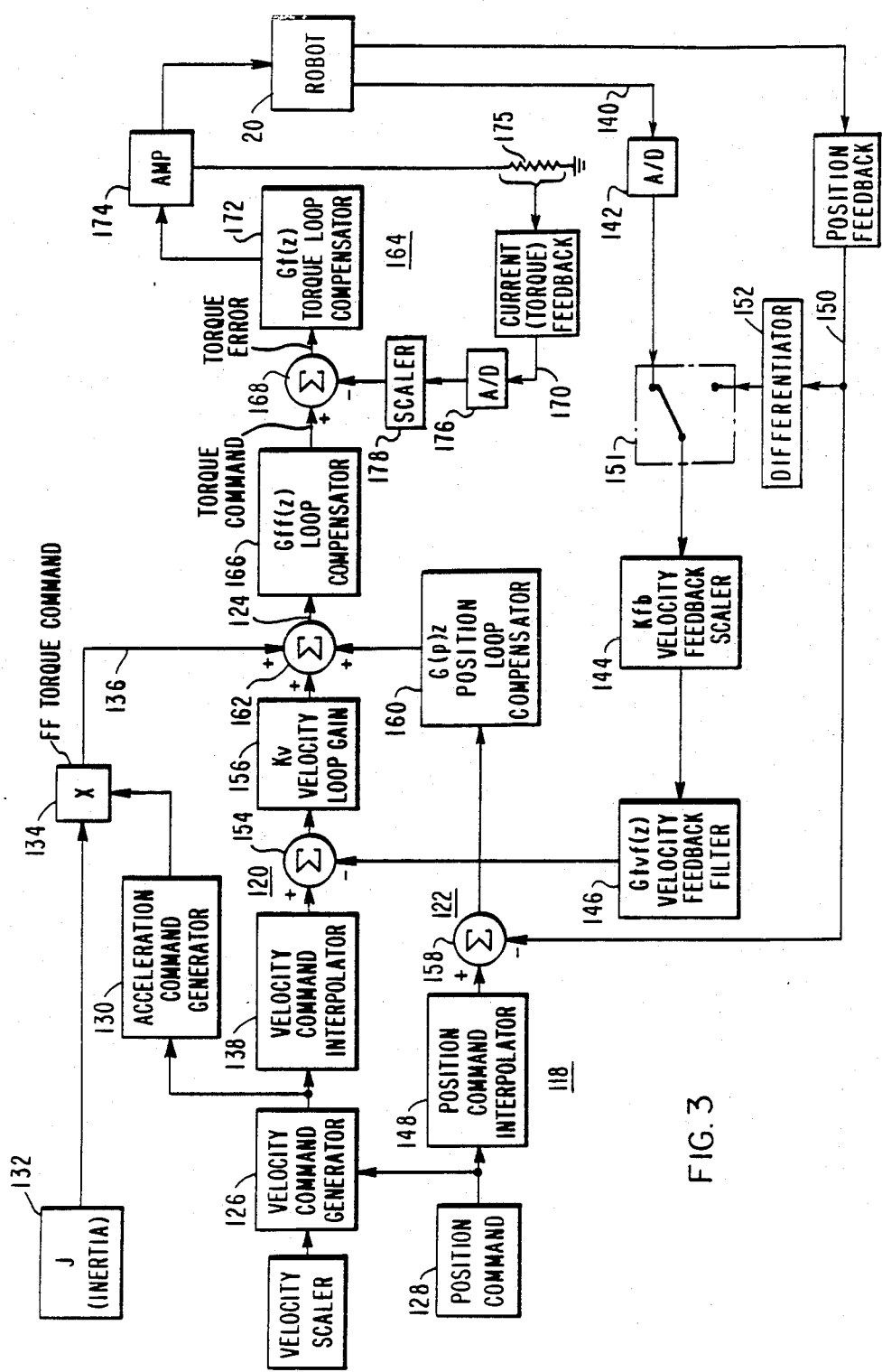
FIG. 3 shows a more detailed block diagram of a control loop arrangement employing position, velocity and torque control loops in which the invention preferably is embodied.

FIG. 3 shows the preferred generalized control loop configuration 118 presently employed in the UNIVAL robot control. It is preferably implemented as a completely digital control. With the provision of hierarchical architecture and multiprocessor architecture and floating point hardware as described herein or in other patent applications referenced above, the trajectory cycle can be characterized with a cycle time in the range of 32 to 8 milliseconds depending on the employed modular configuration.

In the preferred control loop arrangement 118, control loop 120 and velocity control loop 120 and are parallel fed to the input of a torque control loop 124. Velocity commands are generated by block 126 from position commands received by block 128. In turn, feedforward acceleration commands are generated by block 130 from the velocity commands. Computed inertia (load and arm) 132 is multiplied against the acceleration command as indicated by reference character 134 in the feedforward acceleration control loop 136.

In the velocity loop 120, the velocity command in the present embodiment is generated once every 8 to 32 milliseconds depending on the modular configuration of the robot control. The basic robot control described subsequently herein has a trajectory cycle time of 32 milliseconds while the enhanced contact has a trajectory cycle of 8 milliseconds.

In any case, a velocity command generator 138 interpolates velocity commands at the rate of 1 each millisecond which corresponds with the velocity feedback sampling rate in velocity feedback path 140. As shown, velocity feedback for a Unimation 860 robot is produced by tachometer signals which are converted from analog to digital by converter 142. A scaler 144 and a filter 146 supplement the velocity feedback circuitry.

Similarly, in the position control loop 122, an interpolator 148 generates position commands every millisecond in correspondence with the position feedback sampling rate in feedback path 150. In the Unimation 860 robot control, position feedback is absolute and the velocity and position feedback paths 140 and 150 operate as just described (with switch 151 as shown). For Unimation PUMA robots, tachometers are not available and velocity feedback is computed from incremental position feedback as indicated by block 152 (with the switch 151 swinging to its other position) as described more fully in referenced applications W. E. 53,225 and W. E. 53,368.

Velocity error is generated by summer 154 with gain applied by loop 156. Similarly, position error is generated by summer 158 with gain applied by box 160.

Velocity and position errors and feedforward acceleration command are summed in summer 162. Gain is applied in box 166 to generate a torque command which is applied to the input of torque control loop 164 every millisecond. Torque error is generated in summer 168 by summing the torque command (motor current command) with current feedback from feedback path 170. Box 712 applies a torque loop gain to the torque error to get (motor voltage commands) and pulse width modulated (PWM) signals which are applied to a power amplifier 174 which supplies the motor drive current for robot joint operation. Current feedback from resistor 175 is sampled every 250 microseconds (see referenced patent application W. E. 53,224) and converted to digital signals by box 176 with scaling applied by box 178.

BOARD OVERVIEW

Figure 4:
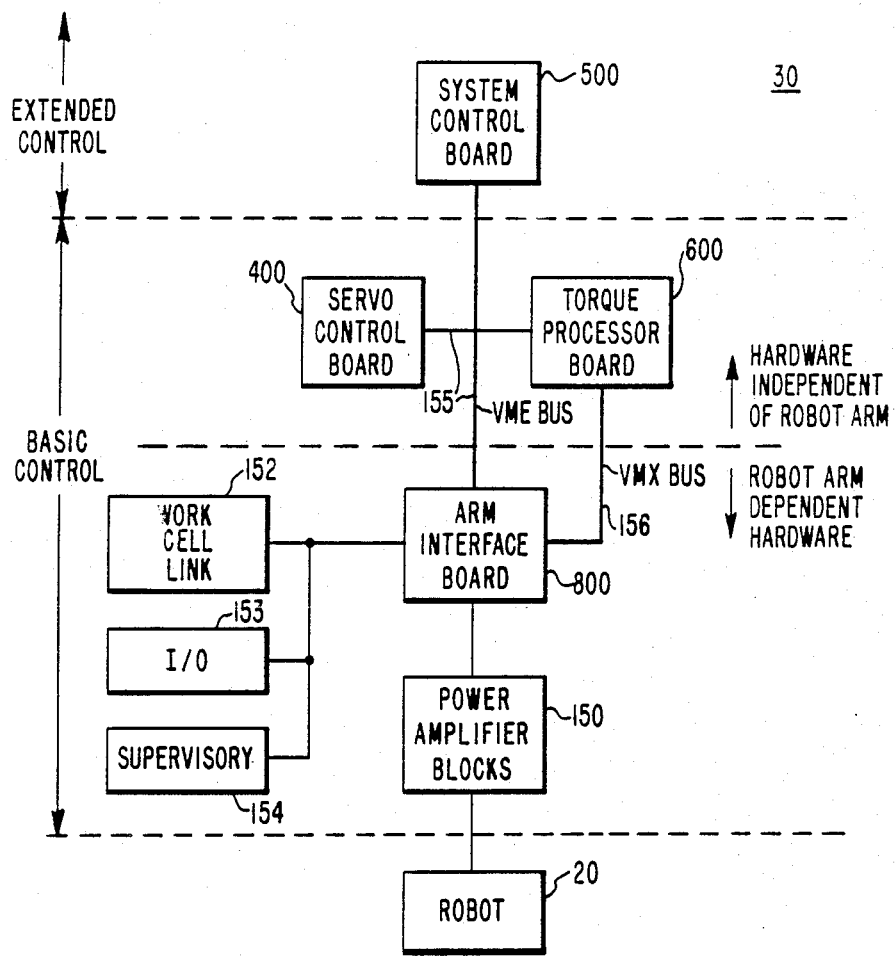
FIG. 4 shows an overview of an arrangement of electronic boards on which circuitry is arranged to implement the robot control system including commutation circuitry employed in embodying the present invention.

Implementation of the control looping for the robot control 30 in FIG. 4 is achieved by the use of digital control circuitry disposed on a plurality of electronic boards. The organization of the circuitry on the boards and the partitioning of programming among various microprocessors enables advanced robot control performance to be achieved with a modular control configuration characterized with economy of manufacture, facility and universality of use, and flexibility in choice of level of control performance.

As shown in FIG. 4, the control board configuration includes an arm interface board 800 which preferably houses all circuitry dependent on the type of robot arm being controlled. For example position feedback circuitry will differ according to whether absolute or incremental position feedback is used by the robot arm to be controlled. Thus, two or possibly more varieties of the arm interface board 800 can be employed to provide digital control systems for any of a variety of different sizes or types of robot arms. Any particular robot arm would require use of the arm interface board which is structured to work with that robot arm.

The arm interface (AIF) board 800 also houses generic circuitry such as VME bus control circuitry which is generally related to two or more boards and not to any one board in particular.

Control signals (pulse width modulated) are generated from the AIF board 800 to control power amplifier blocks 150 which supply motor currents to the robot joint motors. The AIF board 800 also operates as a channel for external coupling of the robot control 30 to other robot controls in a work cell as indicated by the reference character 152, to programmable controllers and other input/output devices 153 in an area network and to higher level computers 154 for supervisory control.

A torque processor (TP) board 600 and a servo control board 400 are generic circuit boards used with the AIF board 800 and power amplifier blocks 150 in all robot control systems for all robot types. The three circuit boards 400, 600 and 800 lprovide complete 6 axis control for a robot arm and thus form a basic control configuration for the UNIVAL family of robot controls as well as other robot controls.

The torque processor board 600 provides motor torque control in response to commands from the servo control board 400. In turn, the servo control board 400 provides arm solutions and position and velocity control in accordance with a robot control program.

Extended control capability and/or system functioning is achieved by interconnecting additional electronic boards or devices to the basic control 400, 600, 800. For example, with the addition of a system control board 500 and partitioning of predetermined program functions including the arm solutions from the servo control board 400 to the system control board 500, the UNIVAL TM robot control can operate the robot 20 and other robots with significantly faster control action, i.e., with a trajectory cycle shortened from thirty-two microseconds to eight microseconds.

Interboard data communications for control and other purposes occur over multiple signal paths in a VME bus 155. Additionally, a VMX bus 156 is provided for connection between the torque processor board 600 and the AIF board 800.

Multiple pin interconnectors (not shown in FIG. 4) are provided on the AIF, TP and SCM boards and any other connectable units to facilitate VME and VMX interboard bus connections modular and board assembly for the robot control 30. Other connectors are provided on the AIF board 800 for external input/output connections.

More detail on the board circuit structure is presented herein or elsewhere in the writeups for the cross-referenced patent applications.

ARM DRIVE CONTROL

As previously described, the higher level control looping generates voltage command signals to be executed through the AIF board 800 for the arm axes so that the arm effector is moved to commanded positions under controlled velocity, acceleration and torque in accordance with a user's robot program. Pulse width modulation circuitry 801 and drive circuitry 802 are provided on the AIF board 800 to develop axis drive signals, in this instance for application to power amplifiers which provide the drive currents to brushless DC electric motors respectively associated with the six axes of arm motion.

PULSE WIDTH MODULATION SCHEME
GENERAL OVERVIEW

The pulse width modulation circuitry provides a digital interface for closing the torque or current control loop through the axis motor drive circuitry. The pulse width modulation concept is applied to control the conduction time width for the joint motor power switches and thereby satisfy motor voltage and torque commands.

Figure 5:
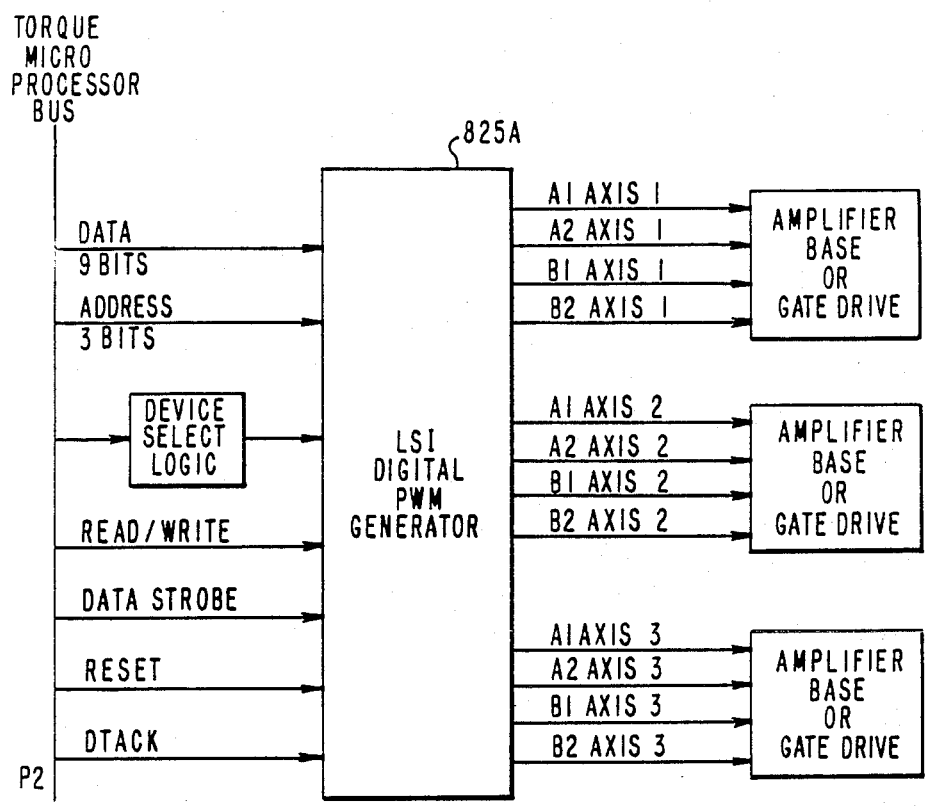
FIG. 5 shows a block diagram of a pulse width modulation (PWM) generator which produces control signals for application to a power amplifier in accordance with the principles of the invention.

As shown in the generalized block diagram of FIG. 5, a digital PWM generator 825A receives 9 bit data commands and 3 register address bits on the torque microprocessor P2 bus (specifically shown elsewhere as the VMX bus). Additionally, device select logic, read/write, reset (initialization) and data strobe signals are received from the P2 bus. A DTACK (acknowledge) signal is returned to the bus by the PWM generator 825A after each reception from the torque calculator on the torque processor board.

The digital PWM generator 825A is preferably arranged to service three axes where, in the present case, either brushless or brush type DC motors are employed as the axis drives. Thus, a set of digital signals (in this instance four such signals A1, A2, B1, B2) is generated for controlling the amplifier base or gate drive circuitry associated with each brushless DC axis motor amplifier.

Figure 9:
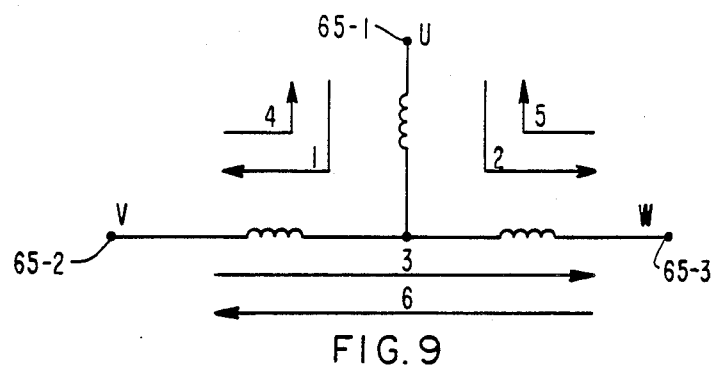
FIG. 9 shows Y connected stator windings of a brushless DC motor energized by the power amplifier circuitry of FIG. 8.
Figure 8:
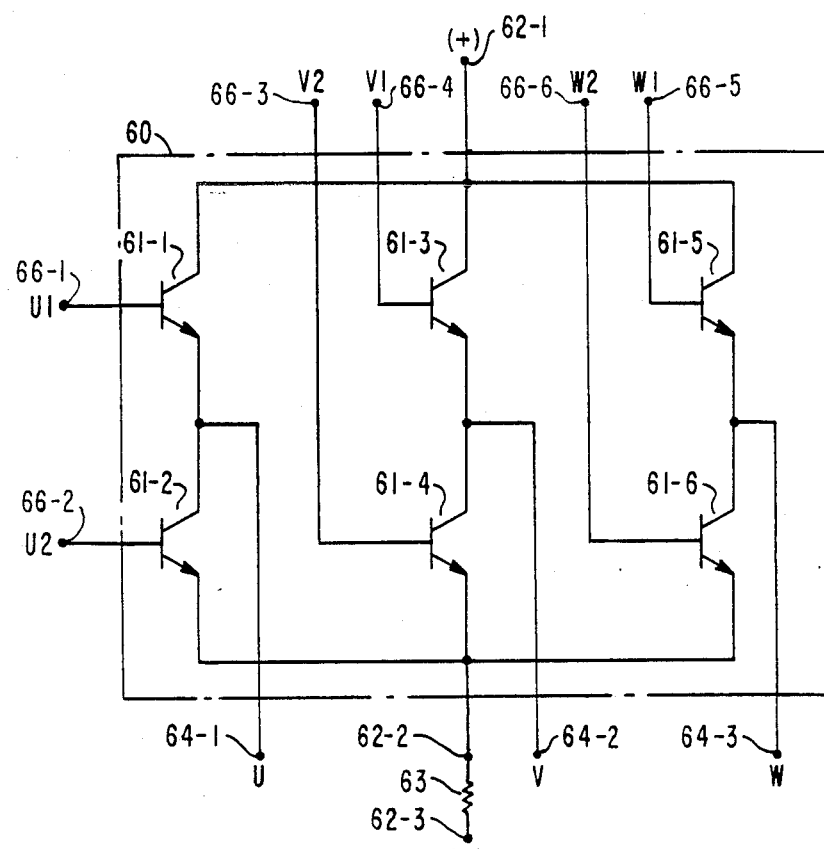
FIG. 8 shows power amplifier circuitry controlled by the circuitry of FIGS. 7A-7D to operate a DC brushless robot joint motor.

Four digital PWM signals are employed to control the direction and magnitude of current flow through the motor windings through on/off power switch control. In the present brushless DC motor application of the invention, the three phase windings of the brushless DC motor in FIG. 9 are interconnected in a bridge circuit (FIG. 8) such that the motor drive current is always directed through a pair of windings and the motor conduction path is rotated or commutated through successive winding pairs to produce the motor drive torque. In this arrangement, the PWM pulses determine the time span of motor current flow and commutation switching logic based on the PWM pulses and Hall effect sensor feedback signals determine the winding pairs through which, and the direction in which, drive current is to flow.

The three address signals generally are encoded to address eight registers within the PWM generator 825A of FIG. 5. Two registers are used to store voltage commands for each axis. A total of six registers are thus used to store voltage commands, and the remaining two registers store command and status data common to the three axes.

Figure 6:
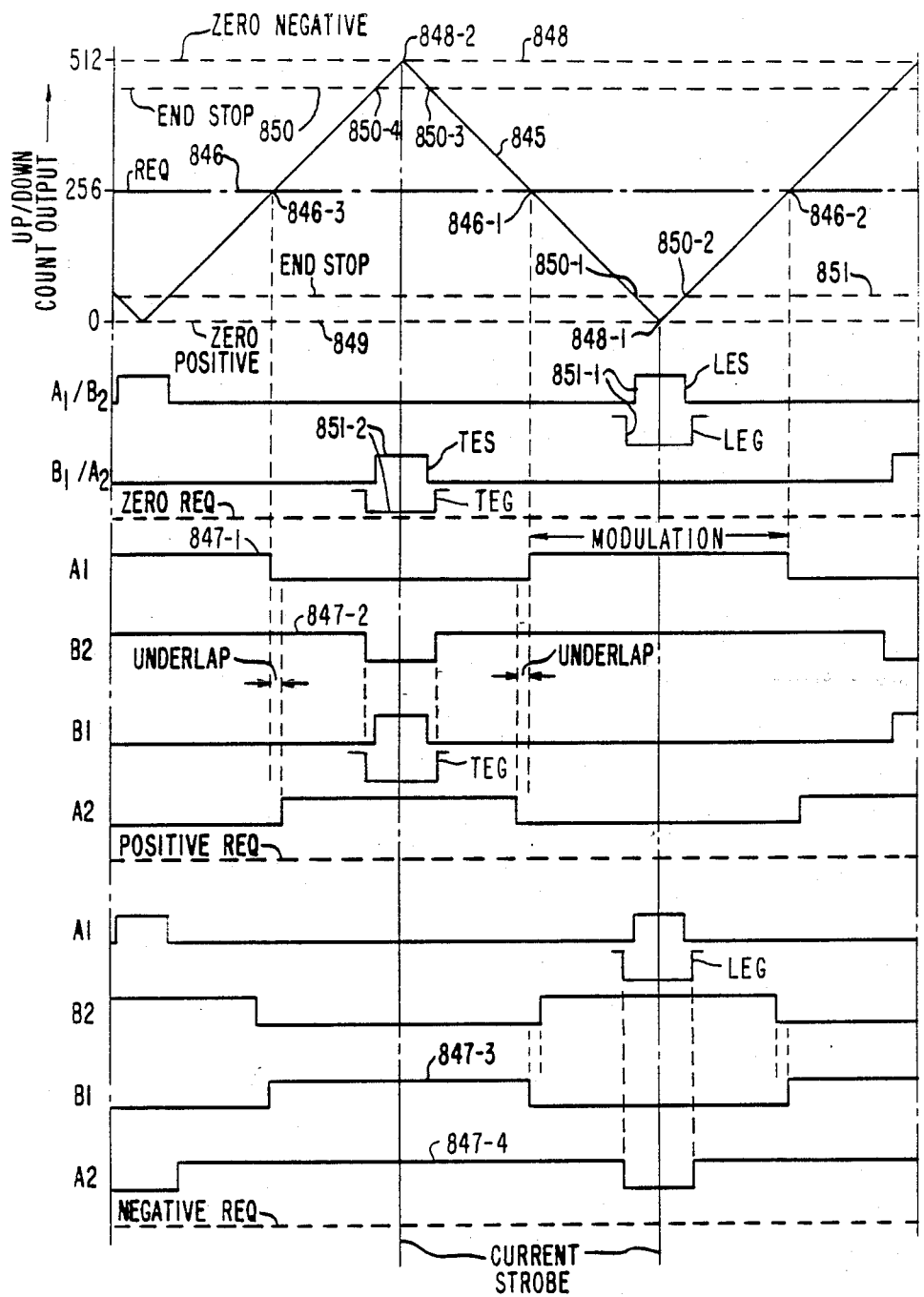
FIG. 6 is a graph which shows control signals generated by the PWM for use in developing digital control signals for application to the power amplifier in accordance with the present invention.

The modulation system used to generate digital switching signals which satisfy axis voltage commands is illustrated in FIG. 6. The up/down counting output of the ramp counter 844 (shown in FIG. 5B of incorporated by reference W. E. 53,225) is represented by a saw tooth wave 845 with a top rail 848 (dashed line) corresponding to a zero negative motor voltage command with increasing negative voltage commands corresponding to decreasing ordinate values. Bottom rail 849 (dashed line) similarly corresponds to a zero positive motor voltage command with increasing positive voltage commands corresponding to increasing ordinate values. The output control pulses A1, A2, B1, B2 are used with additional processing circuitry to control, the DC brushless power switching amplifier of FIG. 8.

Generally, the width of an output control pulse is logically determined by scaling the voltage request or command (dashed horizontal line 846 corresponding to a counter count of 256) along the ordinate for the counter sawtooth waveform 845 according to the magnitude of the voltage command. In illustrative Case No. 1, positive voltage commands are scaled upward from end point 848-1 and intersect points 846-1 and 846-2 define the width of the resultant A1 control pulse 847-1 needed to execute the commanded positive motor voltage (with B2 enabling pulse, 847-2, on as shown). With A1 and B2 on, current flows through the motor in a forward direction.

In illustrative Case No. 2, negative voltage commands are scaled downward from end point 848-2 and intersect points 846-3 and 846-1 define the width of the resultant B1 control pulse 847-3 needed to execute the commanded negative motor voltage (with A2 enabling pulse, 847-4 on as shown). With B1 and A2 on, reverse motor current is enabled.

For a zero voltage command, forced negative and positive end stop control voltages represented by dotted lines 850 and 851 together produce an effective motor voltage of zero. The forced positive and negative end stop control pulse TES, TEG and LES, LEG respectively, enable an identification of the polarity and magnitude of motor current and thereby enable motor current to be sensed for feedback control. This permits the use of economy hybrid power packs with a single power amplifier sense resister 63 in the present brushless DC motor embodiment. Thus, current through the current sense resistor 63 is the motor current and, although the resistor current is not always in the same direction, the motor current direction (polarity) at any point in time can be determined from the polarity of the last end stop control pulse. Reference is made to incorporated by reference patent application W. E. 53,224 for more description of the motor current feedback sensing system.

Circuitry associated with the up/down counter 844 (shown in FIG. 5B of W. E. 53,225) senses the cycle count to initiate power amplifier switching in both the positive end region and the negative end region of the sawtooth counter waveform thereby producing forced motor current at both ends of the counter waveform even if the received motor voltage command is zero (i.e., near and at the maximum positive count and the maximum negative count). As shown in FIG. 6, intersect points 850-1 and 850-2 define the width of the positive A1 end stop control pulse 851-1. Similarly, intersect points 850-3 and 850-4 define the width of the negative B1 end stop conrol pulse 851-2.

Since the conducted currents are equal but opposite over the two end stops in each PWM cycle, the effective end stop motor current during each PWM cycle is zero. The end stop currents are produced regardless of the level of the motor voltage command, and calibration of the up/down counter count to motor voltage level for comparison with command voltage in the comparator 845 takes the end stop currents into account.

End stop switching results from two ramp end stop control pulses 851-1 (LES and LEG), generated within the PWM devices 828 and 829 in FIG. 5B of incorporated by reference W. E. 53,225.

Two of the end stop switch signals are associated with the lower extremity of the ramp, the center of which represents the positive request modulation midpoint. This extremity is referred to as the lower end stop. Similarly, two ramp end stop control pulses 851-2 (TES and TEG) similary generated and centered on the upper extremity of the PWM ramp the center of, which represents the negative request modulation midpoint and is referred to as the upper end stop.

Within the lower end stop, one of the end stop pulses LEG forces PWM drive signals B1 and A2 to be non-asserted, and the other end stop pulse LES forces PWM drive signals A1 and B2 to be asserted.

Within the upper end stop, one of the end stop pulse TEG forces PWM drive signals A1 and B2 to be non-asserted, and the other lower end stop pulse TES forces PWM drive signals B1 and A2 to be asserted. The ramp end stop pulses, TES and LES, are made available as device output signals.

Greater detail on the PWM circuitry is set forth in incorporated by reference W. E. 53,225.

BRUSHLESS DC MOTOR WINDINGS

In FIG. 9, there is shown the stator winding circuitry for DC brushless motors employed as axis drives in various robots including the Unimation 860 robot which is more powerful than the Unimation 700 Series robot shown in FIG. 1.

POWER AMPLIFIER FOR BRUSHLESS DC MOTORS

A commercially available, low cost hybrid power amplifier block 60 (FIG. 8) is provided for energizing the DC brushless motor windings. As indicated by the dotted box, the power amplifier block 60 is packaged to include the six semiconductor switches 61-1 through 61-6 needed for operating the three phase windings of the brushless DC motor. The block 60 is a low cost power amplifier mainly because the device is packaged to contain a simple switching circuit configuration without internal control loops.

The power amplifier block 60 is provided with external power supply terminals 62-1 and 62-2. A current sense resistor 63 is connected to the terminal 62-2 for series connection to the power supply so as to provide motor current feedback signals for control loop operation as more fully disclosed in cross-referenced patent application W. E. 53,224.

The power amplifier block 60 additionally includes external terminals 64-1, 64-2 and 64-3 for respective connection to the free ends 65-1, 65-2 and 65-3 of the Y connected motor windings. External terminals 66-1 through 66-6 are also provided for application of the switch control signals U1 and U2, V1 and V2 and W1 and W2 from the PWM commutation circuitry. To prevent power supply shorting and switch burnout, the power switches are always controlled so that only one switch can be on at a time in each of the respective parts of switches 61-1 and 61-2, 61-3 and 61-4, and 61-5 and 61-6.

The control signals U1, V1 and W1 are the basic pulse width control signals that control the level of drive current through the motor windings. The control signals U2, V2, and W2 enable the six motor winding conduction paths in rotation and generally provide for the flow of freewheeling motor currents.

Figure 10:
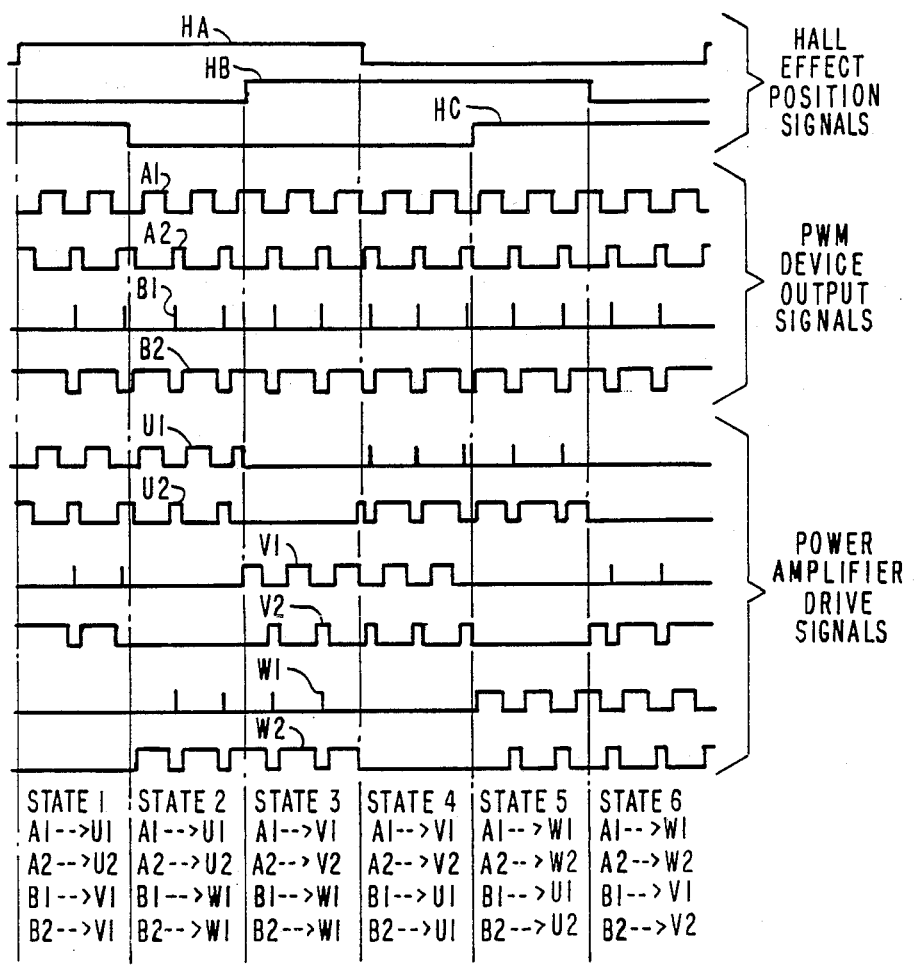
FIG. 10 shows a waveform diagram illustrating the relationship among various signals generated in the circuitry of FIGS. 5 and 7-9.

The following listing in conjunction with FIGS. 9 and 10 will provide a more complete understanding of the rotating (commutated) motor conduction paths and how the power switches operate to rotate the motor conduction paths and produce the rotating rotor gap magnetic flux which drives the rotor:

| Path | Switches Turned On | Windings Serially Connected |
|------|--------------------|-----------------------------|
| 1    | U1-V2              | U-V                         |
| 2    | U1-W2              | U-W                         |
| 3    | V1-W2              | V-W                         |
| 4    | V1-U2              | V-U                         |
| 5    | W1-U2              | W-U                         |
| 6    | W1-V2              | W-V                         |

POWER AMPLIFIER CONTROL SIGNALS

AIF board circuitry shown in FIGS. 12A, 12B, and 12C of incorporated by reference W. E. 53,224 for each of the six robot axes is used to generate the power amplifier control signals U1 through W2 from the PWM signals A1, A2, B1 and B2 and couple the same to the power amplifier output terminals on the AIF board 800.

Separate drive circuit channels 860J1-860J6 shown in FIGS. 7A, 7B and 7C, 7D are provided on the AIF board 800 to process and couple the PWM digital outputs to the power amplifiers for the respective robot joint motors. Since the drive circuit channels are alike, not one channel 860J1 will be described.

At the input of the drive circuit for this channel 860J1, four PWM digital drive pulses AP1A1-A2 and AP1B1-B2 are applied to a PAL device 861-1. As previously described, the A and B pulses are time shifted, the A2 and B2 pulses are relatively wide enable and the A1 and B1 pulses have varying time width to function as control pulses (within the B2 and A2 time spans, respectively).

In addition, three similarly prefixed feedback commutation signals AP1(CAL-CDL-CCL) from the joint 1 brushless DC motor are applied to the PAL device 861-1. As shown in FIG. 13F-1 of incorporated by reference W. E. 53,373, three Hall effect sensors 864-1, 865-1, 866-1 are disposed about the periphery of the joint 1 motor to respond to magnetic flux changes and indicate the position of the rotor and which way the rotor is moving. Like sensors are employed for each joint motor as shown FIGS. 13F-2 to 13G-2 of W. E. 53,373. Each sensor signal is routed to a comparator 867 which operates a gate 868 when the sensor signal reaches a reference level.

The nine gate output signals from the nine comparator circuit channels which process the Hall effect sensor signals from joint motors 1, 2 and 3 are applied to a two component latch register 869 in FIG. 13F-2 of incorpoated W. E. 53,373 which in turn generates commutation signals for the commutation PALS 861-1, 861-2, 861-3. A latch register 870 similarly in FIGS. 13G-2 of W. E. 53,373 generates commutation signals that are applied to the PALS 861-4, 861-5, 861-6 for joint motors 4, 5 and 6. Respective buffers 871 and 872 access the commutation signals to the P2 data bus for the torque processor board 600 thereby providing a basis for modification of PWM output signals as a function of motor rotor position. These signal can also be used as the basis for providing software commutation in an alternative arrangement for control of the three motor windings.

Figure 7A:
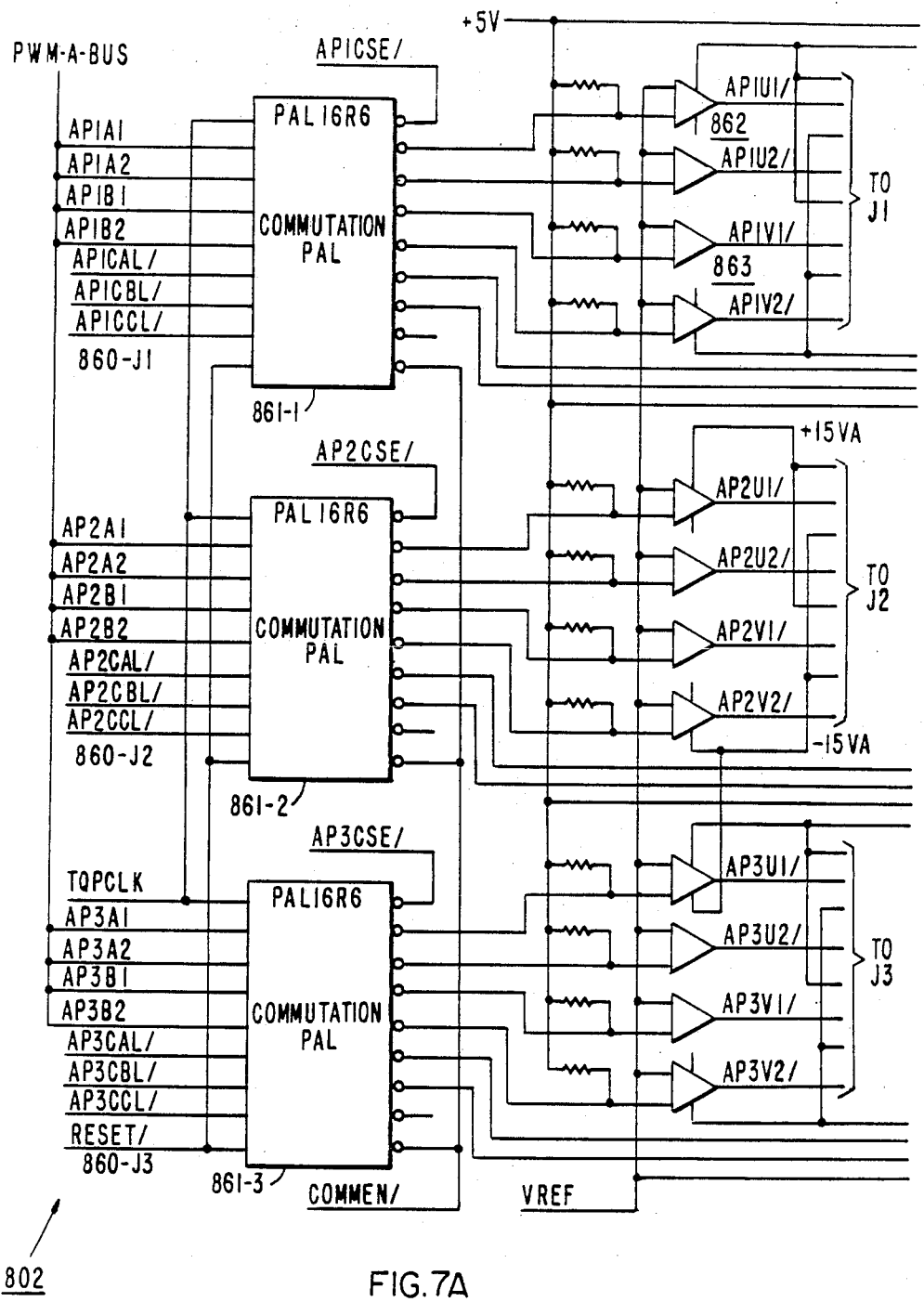
FIGS. 7A-7D show circuitry on the arm interface board employed in accordance with the invention to develop brushless DC motor control signals from motor position feedback signals and from the PWM device of FIG. 5.
Figure 7B:
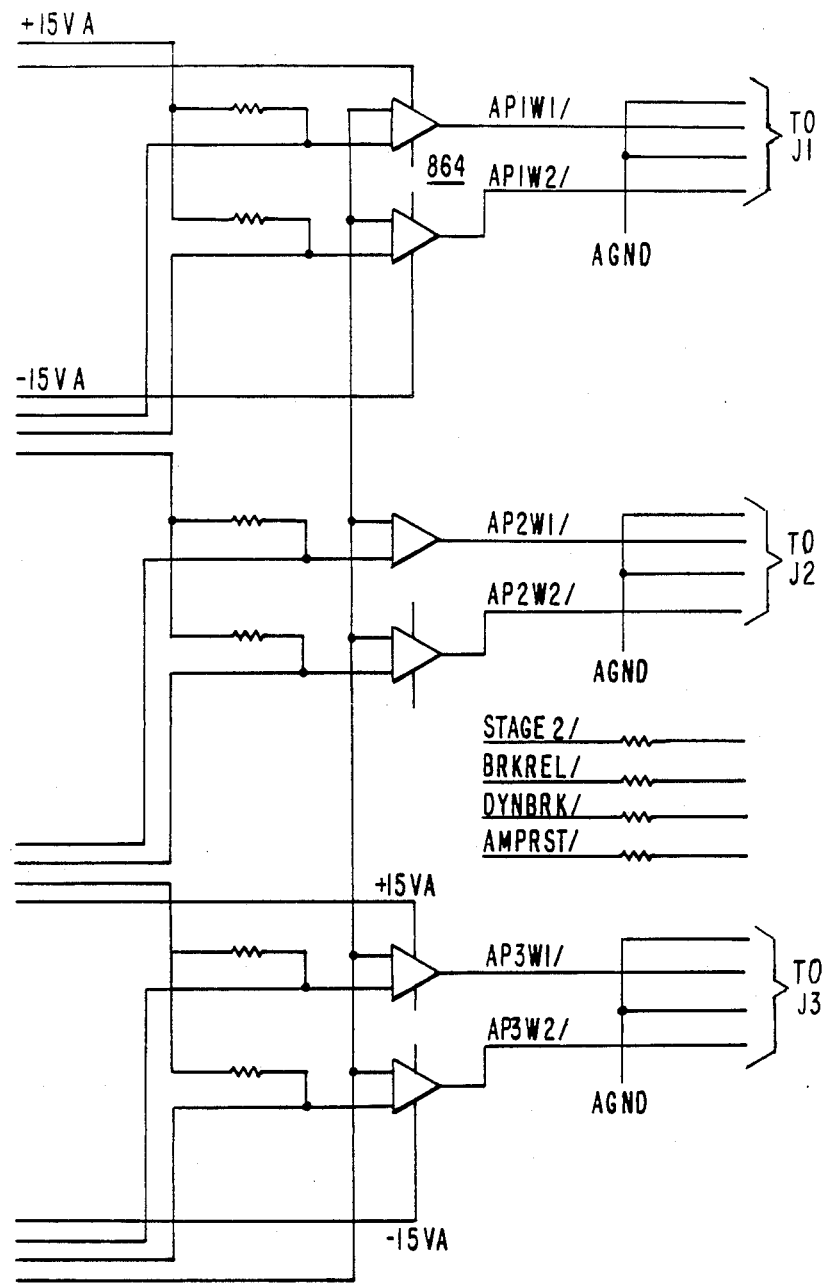
Figure 7C:
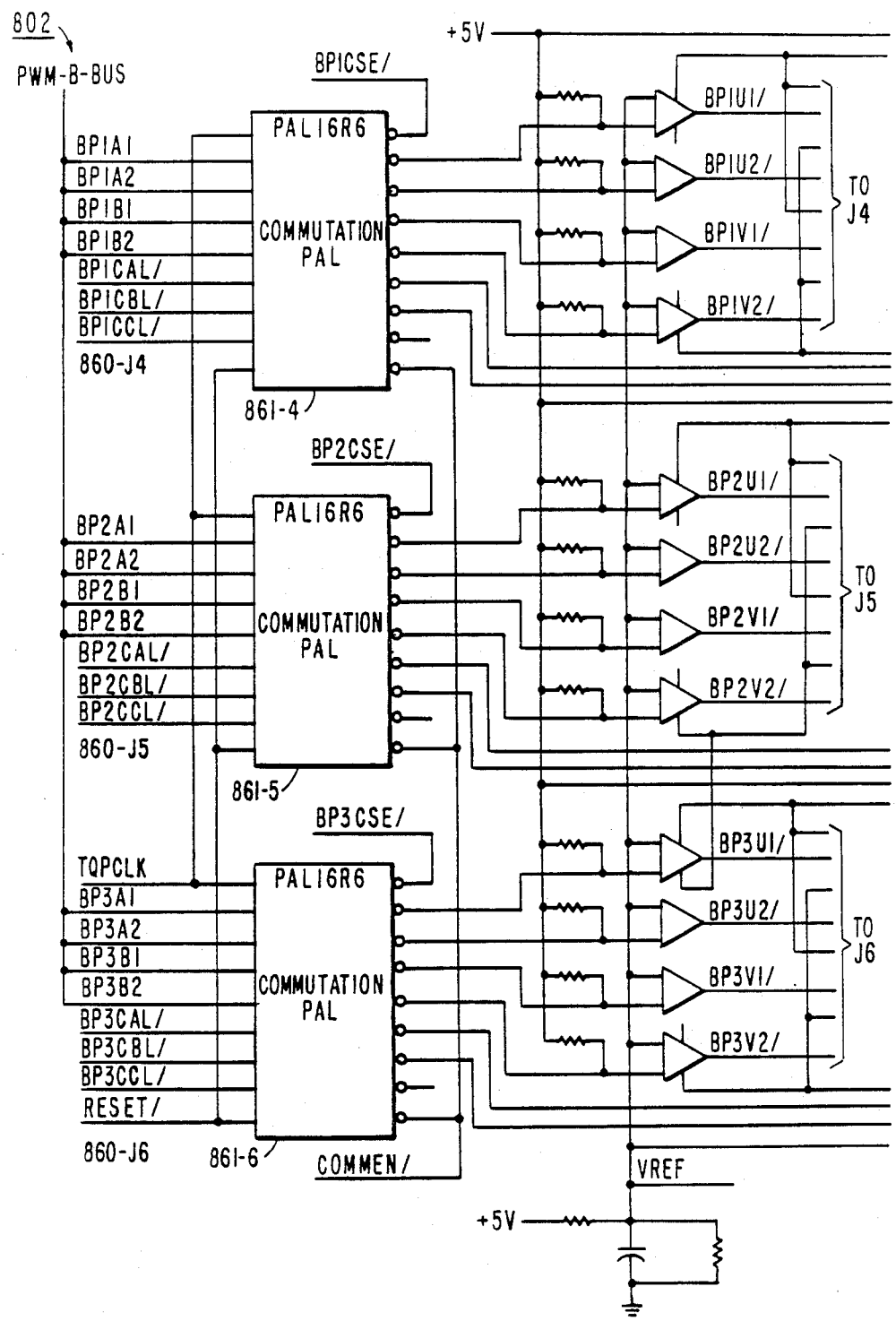
Figure 7D:
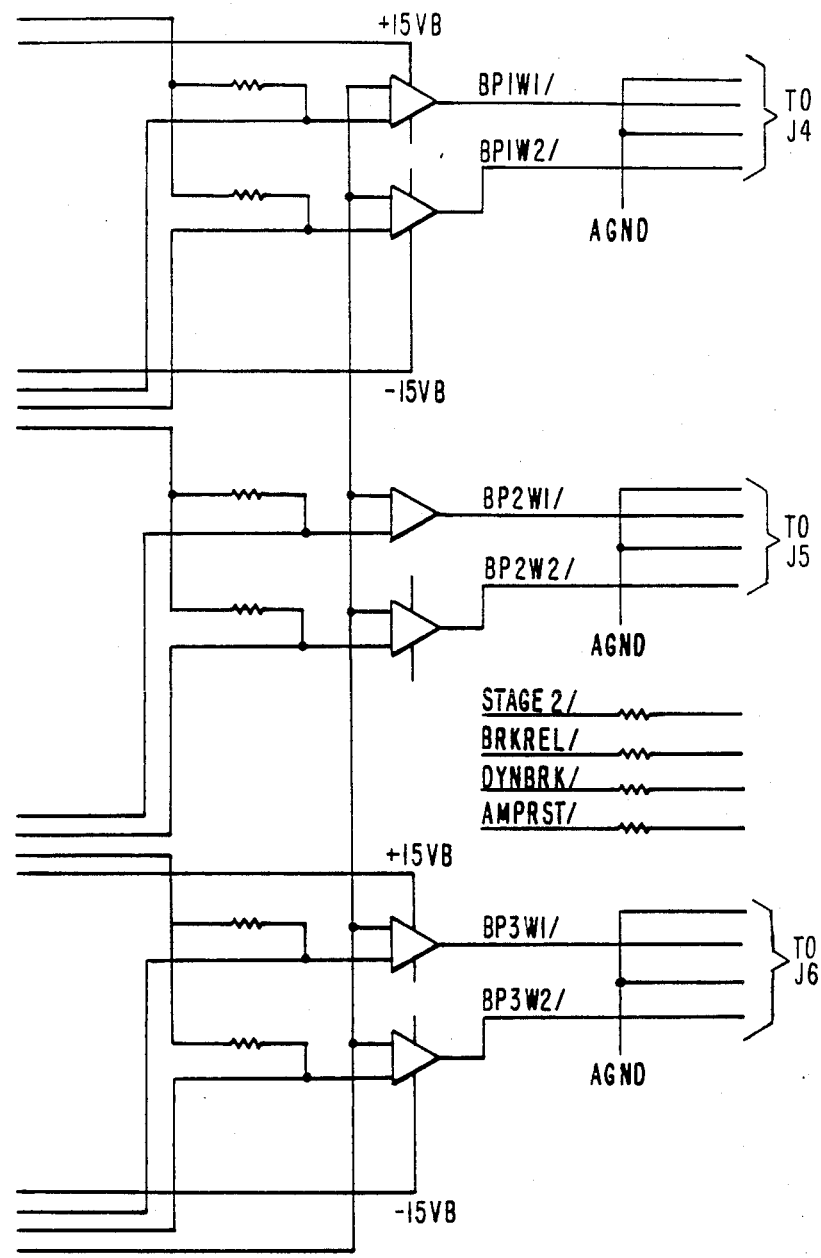

Thus, the PAL device 861-1 logically operates analog driver circuits 862, 863 and 864 in FIGS. 7A and 7B to generate commutation timed signal sets A1U1-U2, AP1V1-V2 and AP1W1-W2 for application to the power amplifier switches shown in FIG. 9 which in turn direct motor drive current pulses through the joint 1 motor windings in accordance with the commutation control and in accordance with the pulse width modulation control. The currents through the windings of the other joint motors are similarly controlled by the other PAL devices 861-2 through 861-6.

Figure 7E:
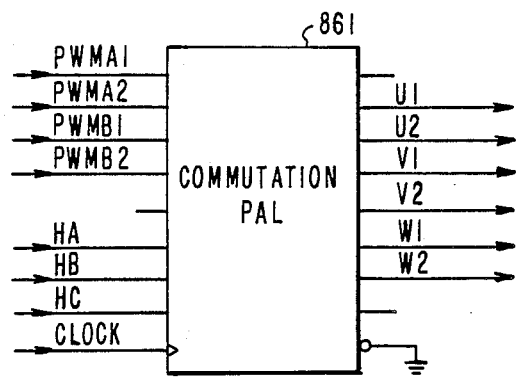
FIG. 7E shows a PAL device included in the circuitry of FIGS. 7A-7D to perform commutation logic.

A simplified schematic of the commutator PAL devices 861-1 through 861-6 is shown in FIG. 7E as a commutation PAL device 861 with input signals A1, A2, B1 and B2 from the PWM and HA, HB and HC from the Hall sensors and output signals U1 through W2 to the power amplifier. The PAL device is a commercially available programmable array logic device which is programmed with the following logic equations to generate the designated outputs from the applied inputs:

$$U1 = A1 \cdot HA \cdot \overline{HB} + B1 \cdot \overline{HA} \cdot HB$$
$$U2 = A2 \cdot HA \cdot \overline{HB} + B2 \cdot \overline{HA} \cdot HB$$
$$V1 = A1 \cdot HB \cdot \overline{HC} + B1 \cdot \overline{HB} \cdot HC$$
$$V2 = A2 \cdot HB \cdot \overline{HC} + B2 \cdot \overline{HB} \cdot HC$$
$$W1 = A1 \cdot HC \cdot \overline{HA} + B1 \cdot \overline{HC} \cdot HA$$
$$W2 = A2 \cdot HC \cdot \overline{HA} + B2 \cdot \overline{HC} \cdot HA$$

Figure 7F:
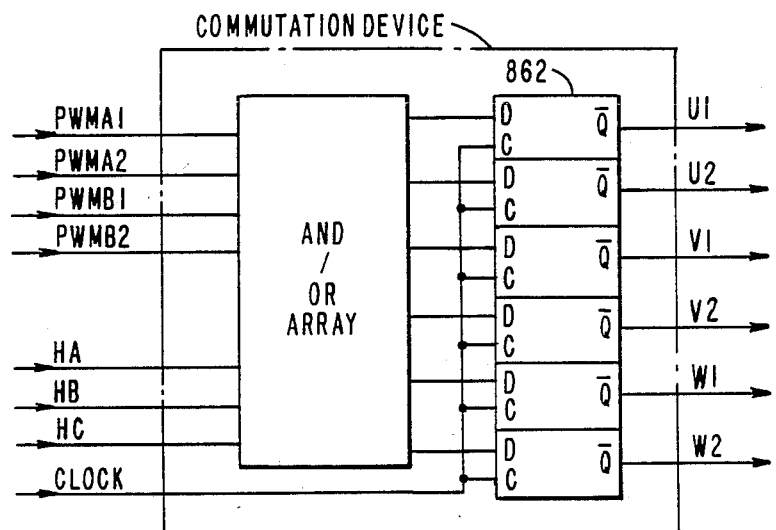
FIG. 7F shows a general representation of the logic performed within the PAL device.

As shown in FIG. 7F, the power amplifier control pulses U1 through W2 are logically controlled by block 862 to be synchronized with the clock pulses C.

The waveforms shown in FIG. 10 show more clearly the manner in which the various pulses are related. At the top of the graph, the Hall effect rotor position signals are observed to be overlapping pulses which are phase shifted by 60 electrical degrees.

The A1 and B2 pulses are being generated to produce motor drive current in the forward direction. Thus, the B2 pulse is a wider enabling pulse that embraces the A1 pulse but is off during the on time of the B1 pulse. The width of the A1 pulse provides control over the switch on time in the power amplifier.

The A2 pulse is a wider enabling pulse for the B1 pulse which in this instance is a narrow end stop control pulse explained more fully in cross-referenced patent application Ser. No. 932,975 now continuation Ser. No. 180714 filed Apr. 4, 1988. Generally, both the A1 and B1 pulses are implemented to force current conduction through the connected motor winding at both ends of the PWM ramp even if the control command is not otherwise calling for drive current.

The PAL generated power amplifier drive signals U1 through W2 are shown at the bottom of the graph. The successive winding connection states (or motor conduction paths) 1 through 6 are designated between the vertical dotted time lines.

What is claimed is:

1. A system for digitally controlling and energizing a brushless DC arm joint motor in a robot control, said system comprising:

three interconnected phase windings for said motor;

a power amplifier having first through sixth switching means interconnected with said windings to direct drive current through series paired windings corresponding to the switching operation of pairs of said switching means;

a digital pulse width modulator circuit having up/down counter means for generating a sawtooth voltage waveform representing counts as a function of time;

means for comparing the counter means count to a voltage signal representing control command so as to digitally control and define the time width of forward and reverse reference control pulses for said power amplifier switching means in accordance with the compared control command voltage signal and the polarity of the control command signal;

means for generating an enabling reference control pulse for each of said reference control pulses;

means for generating a plurality of phase displaced signals representative of motor rotor position;

means for generating respective control pulses which operate the six power amplifier switching means and correspond in time width to said reference control pulses; and commutating means responsive to said position signals and the polarity of the control command signal to apply successive pairs of said switch control pulses to said switching means so as to produce digitally commutated, pulse width modulated, motor drive current for the command time as the motor current path is commutated from winding pair to winding pair in accordance with the polarity of the control command signal and a predetermined sequence of phase rotation.

2. A system as set forth in claim 1 wherein:

a first reference control pulse represents one control command signal polarity and is based on a count comparison referenced to the upper endpoint of the sawtooth waveform; and a second reference control pulse represents the other control command signal polarity and is based on a count comparison referenced to the lower endpoint of the sawtooth waveform.

3. A system as set forth in claim 1 wherein said commutating and control pulse generating means are embodied in a programmed logic array (PAL) device programmed in accordance with the following equations:

$$U1 = A1 \cdot HA \cdot \overline{HB} + B1 \cdot \overline{HA} \cdot HB$$
$$U2 = A2 \cdot HA \cdot \overline{HB} + B2 \cdot \overline{HA} \cdot HB$$
$$V1 = A1 \cdot HB \cdot \overline{HC} + B1 \cdot \overline{HB} \cdot HC$$
$$V2 = A2 \cdot HB \cdot \overline{HC} + B2 \cdot \overline{HB} \cdot HC$$
$$W1 = A1 \cdot HC \cdot \overline{HA} + B1 \cdot \overline{HC} \cdot HA$$
$$W2 = A2 \cdot HC \cdot \overline{HA} + B2 \cdot \overline{HC} \cdot HA$$

wherein U1 U2, V1, V2, W1 and W2 are the switching means control pulses, A1, A2 and B1, B2 are the reference control pulses, and HA, HB and HC are the overlapping position signals which are phase shifted sixty electrical degrees with respect to each other.

4. A digital control for a robot having a plurality of arm joints, said control comprising:

a brushless DC motor for driving each of the arm joints;

three interconnected phase windings for said motor;

a power amplifier having first through sixth switching means interconnected with said windings to direct drive current through series paired windings corresponding to the switching operation of pairs of said switching means;

a digital pulse width modulator circuit having up/down counter means for generating a sawtooth voltage waveform by counting up and down as a function of time;

means for comparing the voltage of the counter means count for the sawtooth waveform to a voltage signal representing a drive control command so as to digitally define the time width of forward and reverse reference control pulses for said power amplifier switching means in accordance with the drive control command voltage and the polarity thereof of the control command;

means for generating an enabling reference control pulse for each of said reference control pulses;

means for generating a plurality of phase displaced signals representative of motor rotor position;

means for generating respective control pulses which operate the six power amplifier switching means and correspond in time width to said reference control pulses;

commutating means responsive to said position signals and the polarity of the drive control command to apply successive pairs of said switch control pulses to said switching means so as to digitally rotate the pulse width modulated motor drive current for the command time as the motor current path is commutated from winding pair to winding pair in accordance with the command polarity and a predetermined rotational sequence; and feedback control loop means for each arm joint and including at least position, velocity and current control loops looping through and operating the associated pulse width modulator circuit.

5. A robot having:

an arm with a plurality of joints;

each of said joints having a brushless DC motor as a drive;

three interconnected phase windings for said motor;

a power amplifier having first through sixth switching means interconnected with said windings to direct drive current through series paired windings corresponding to the switching operation of pairs of said switching means;

a digital pulse width modulator circuit having up/down counter means for generating a sawtooth waveform representing counts as a function of time;

means for comparing the counter means count level to a signal magnitude representing a control command so as to define the time width of forward and reverse reference control pulses for said power amplifier switching means in accordance with the magnitude of the control command signal having control command polarity;

means for generating an enabling reference control pulse for each of said reference control pulses;

means for generating a plurality of phase displaced signals representative of motor rotor position;

means for generating respective control pulse which operate the six power amplifier switching means and correspond in time width to said reference control pulses;

commutating means responsive to said position signals and the polarity of the control command signal to apply successive pairs of said switch control pulses to said switching means so as to produce digitally commutated motor drive current for the command time as the motor current path is commutated from winding pair to winding pair in accordance with the command polarity and a pedetermined phase sequence; and feedback control loop means for each arm joint and including at least position, velocity and current control looping through and operating the associated pulse width modulation circuit.

* * * * *